Aug. 1, 1967  W. R. BARR  3,333,369
APPARATUS FOR MOUNTING PLASTIC LENS FOR GRINDING
Filed July 2, 1964  3 Sheets-Sheet 1
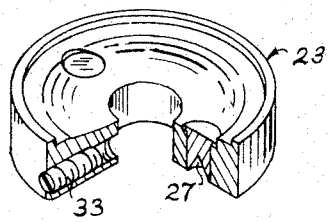
Fig 3
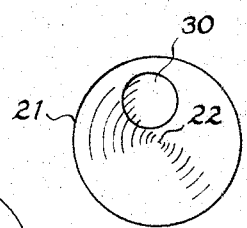
Fig 2
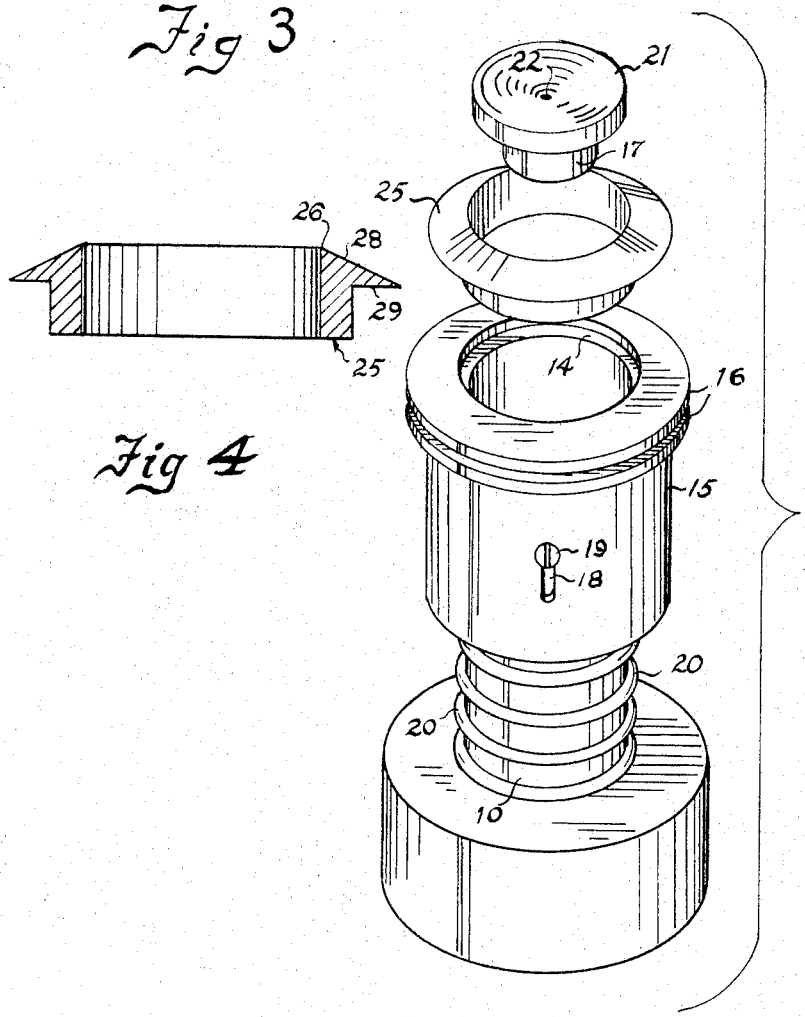
Fig 4
Fig 1
INVENTOR.
WILLIAM R. BARR
BY
Newton, Hopkins & Jones
ATTORNEYS

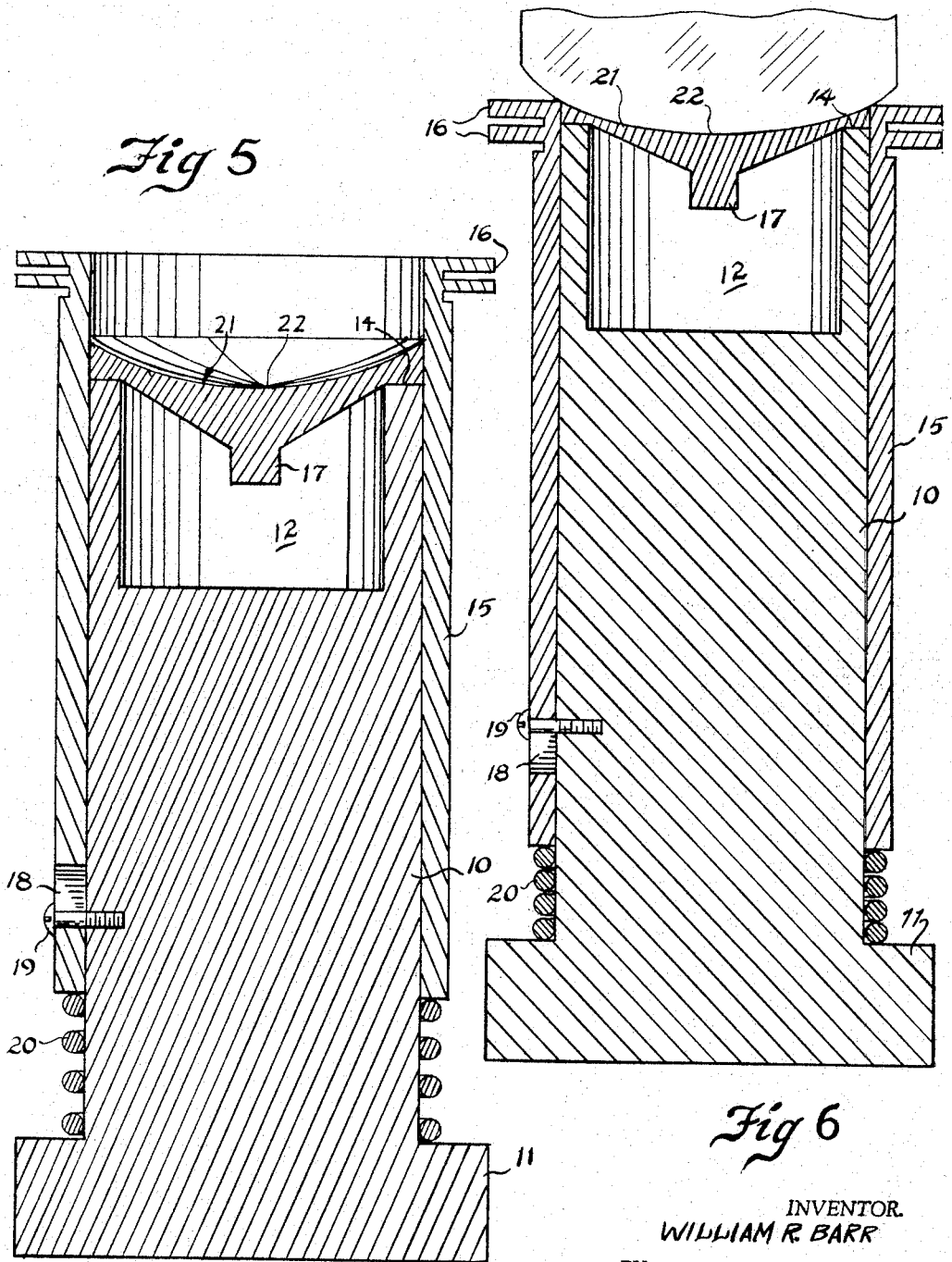

United States Patent Office 3,333,369
Patented Aug. 1, 1967

3,333,369
APPARATUS FOR MOUNTING PLASTIC LENS FOR GRINDING
William R. Barr, R.F.D. 1, Riverdale, Ga. 30274
Filed July 8, 1964, Ser. No. 381,056
8 Claims. (Cl. 51—277)

This invention relates to optical lens grinding apparatus, and is more particularly concerned with an apparatus for blocking a semi-finished lens for further grinding.

In the grinding of optical, and especially ophthamalic lenses, the usual procedure is to grind one side of the lens; then, the finished side of the lens is mounted in a block to hold the lens while the other side is ground. This is commonly called blocking the lens. The conventional lens block is designed to receive a lens, and to allow the lens block with the blocked lens to be held in a grinding machine for the opposite side of the lens to be ground accurately.

In the past, numerous blocking devices have been provided for blocking lenses. These previous devices have usually required that a semi-finished lens be supported by a plurality of pointed fingers, the fingers being arranged to provide the desired orientation of the semi-finished lens with respect to the block. Although such a device can be used with great accuracy on a glass lens, when such a device is used with a plastic lens the lens will be distorted, since the plastic lens cannot support its own weight without inducing extraneous distortion. Also, a plastic lens must be held to the block by a very thin layer of blocking compound to prevent distortion to uneven distribution of blocking compound between the semi-finished lens and the block. To get this thin, even layer of blocking compound, uniform pressure is required when seating the lens on the lens block. Previous blocking devices have not provided for such uniform pressure when securing the semi-finished lens to the lens block.

The apparatus of the present invention provides an admirable solution to the problems discussed above. There is a block receiving member having a sleeve slidable thereon. The arrangement is such that the block receiving member will support the lens block while the sleeve prevents radial movement thereof. A lens block is placed on the block receiving member, blocking compound is dispensed into the block, and the semi-finished lens is placed on the sleeve. The lens is then pushed down, causing the sleeve to slide on the block receiving member, and causing the finished side of the semi-finished lens to engage the lens block and be adhered thereto by the blocking compound. Indicia are provided to align the lens with the block, and means are provided for the rapid cooling of the blocking compound.

The apparatus of the present invention therefore provides a lens blocking apparatus that is very simple in construction, is dependable, rugged and well designed to be manufactured economically. Other features and advantages of the present invention will become apparent from consideration of the following specification when taken in conjunction with the accompanying drawings in which:

FIG. 1 is an exploded perspective view of one embodiment of the present invention, showing an adapter ring in conjunction therewith;

FIG. 2 is a top plan view of a lens block for use with a bifocal lens;

FIG. 3 is a perspective view of a block holder, having a portion thereof cut away;

FIG. 4 is a transverse cross-sectional view of the adapter ring shown in FIG. 1;

FIG. 5 is a longitudinal cross-sectional view of the device shown in FIG. 1 without the adapter ring, the device being in its extended position;

FIG. 6 is a longitudinal cross-sectional view similar to FIG. 5, the device being compressed.

Figure 7:
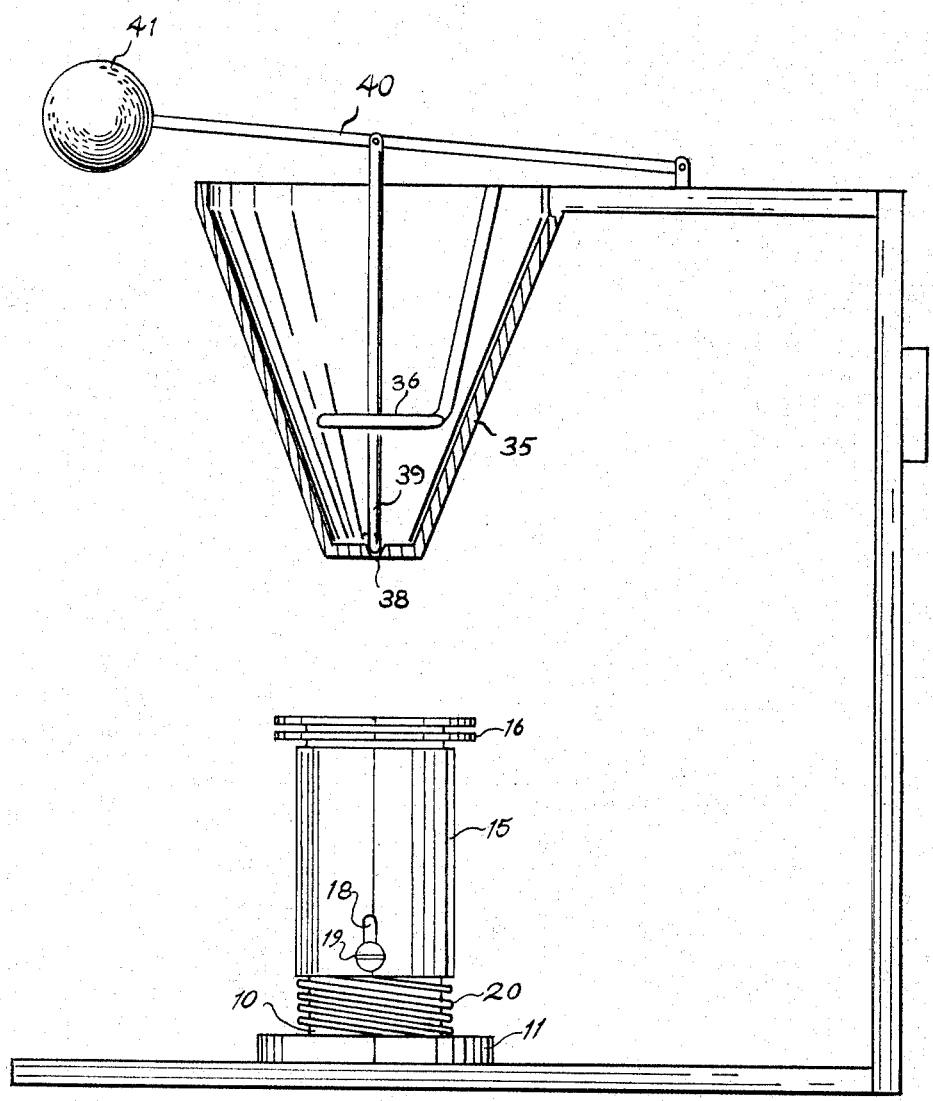
FIG. 7 is a side elevational view, partially in cross-section, of a blocking compound dispensing apparatus for use with the blocking device of the present invention.

Referring now more particularly to the drawings and to that embodiment of the invention here chosen by way of illustration, the blocking device includes a cylindrical body 10 having an enlarged base portion 11. The body 10 is preferably made of metal or similar material that will provide enough weight for good stability of the blocking device. The upper end of the body 10 is formed with a central, axial cavity 12 which leaves a circumferential wall 14. Surrounding the body 10 there is a slidable sleeve 15 that is axially aligned with the body 10 and has circumferential cooling fins 16 around its upper end to facilitate the cooling of the blocking compound. At the lower end of the sleeve 15 there is an elongate slot 18 through which a screw 19 passes to be threadedly inserted into the body 10; and, the screw 19 in the slot 18 provides upper and lower limits to the vertical movement of the sleeve 15 with respect to the body 10. Between the enlarged base portion 11 and the sleeve 15, there is a spring 20 surrounding the body 10 and exerting an upward force on the sleeve 15 to urge the sleeve 15 toward its uppermost position.

It will now be understood that a block 21 will be placed within the sleeve 15 to rest on the wall 14 of the body 10 with a shank 17 extending into the cavity 12. Blocking compound will be dispensed into the block 21; then, a semi-finished lens will be placed on the uppermost edges of the sleeve 15 and urged downwardly until the finished side of the lens engages the block 21 to be stuck thereto by the blocking compound. As is shown in FIG. 1 of the drawings, the block 21 has an indicium 22 in the center thereof; and, it will be understood that the lens will be marked to indicate its optical center and its geometric center as well as other indications that may be needed to grind the lens properly. Therefore, the center of the lens can be aligned with the indicium 22 to orient the lens properly with respect to the block 21. When the lens is pushed down to engage block 21, it will be held for a brief period of time during which the blocking compound will set, aided by the cooling fins 16 which will dissipate the heat very rapidly.

Referring to FIGS. 1 and 4 of the drawings, it will be seen that there is an adapter 25 to adapt the size of the sleeve 15 to receive a smaller size of block. The adapter 25 is formed as an annulus having an inside diameter equal to the block to be used with the device, and an outside diameter substantially equal to the inside diameter of the sleeve 15. The upper end of the adapter 25 has a relatively sharp edge 26, with the downwardly sloping side 28 that connects with a shoulder 29. The adapter 25 will be placed at the upper end of the sleeve 15 with the shoulder 29 engaging the upper edge of the sleeve 15, and the edge 26 located to receive a semi-finished lens thereon. The sloping side 28 should slope downwardly at a relatively sharp angle so that either a convex or a concave lens can be placed on the adapter without the lens engaging the side 28.

It will be thus be understood that an adapter ring 25 can be used for whatever size block is to be used with the device. The inside diameter of the adapter ring 25 will be only very slightly larger than the diameter of the block to be used therewith so the block will slide therein, but will not move appreciably in any radial direction. The use of the lens blocking device with an adapter 25 is exactly the same as the use described above.

The upper edge of the sleeve 15 is in a plane that is perpendicular to the axis of the body 10, and the finished surface of the lens will be spherical; therefore, the lens can be placed on the sleeve 15 with the axis of the lens aligned with the axis of the sleeve 15, the body 10, and the lens block 21. The body 10 and the sleeve 15 are machined to very close tolerances so the axis of the sleeve 15 will always coincide with the axis of the body 10; also the wall 14 is accurately machined to be perpendicular to the axis of the body 10, and the block 21 is accurately machined to have the same thickness around its circumference. As a result, when a lens is blocked using this device, the axes of the lens and the block will exactly coincide, and no prism can be introduced into the lens.

Some lenses will have a cylinder ground into them, and it is important to have the axis of the cylinder properly oriented in the finished lens.

Though, with the usual apparatus, the axis of the cylinder must be oriented properly when the semi-finished lens is attached to the block, with the present device, the orientation of the axis of the cylinder need not be considered when attaching the semi-finished lens to the block. This is because the lens block 21 can be rotated in the block holder 23. The block holder must be positioned in the grinding machine with a certain orientation since the grinding machines have members that are received by the indentations 27.

With the present apparatus, the semi-finished lens can be attached to the block 21 without regard to the orientation of the axis of the cylinder; then, the block 21 will be placed in the block holder 23 and rotated to align the axis of the cylinder with respect to the indentations 27, then the set-screw 33 will be tightened to maintain the desired orientation. When the assembly is mounted in the grinding machine, the axis of the cylinder will be properly oriented.

FIG. 2 of the drawings shows a block to receive a bi-focal lens. It is common practice to grind bi-focal lenses as an integral piece of material, and the area of the lens that has the shorter focal length will normally protrude from the surface of the lens having the longer focal length; therefore, the block may have a recess to accommodate the protruding portion of the bi-focal lens. It will be understood that, while a circular recess 30 is here shown, a recess of any other desired configuration can be used to accommodate the particular shape of the lens portion of short focal length. Not only does the recess 30 provide space to receive the protruding portion of the lens, but it also provides means for assuring proper angular disposition of the bi-focal lens with respect to the block.

Bifocal lenses are ground so that portion of shorter focal length protrudes from the main body of the lens only very little; therefore, a slightly thicker layer of blocking compound can be used to raise the body of the lens sufficiently far from the block to allow clearance for the portion of the lens having the shorter focal length.

It is quite important in the use of the lens blocking device of the present invention to have a proper amount of blocking compound in the block before the semi-finished lens is adhered thereto. One convenient apparatus for dispensing blocking compound is shown in FIG. 6 of the drawings and includes a hopper 35 having a heating element 36 disposed therein to maintain the proper temperature of the blocking compound. The heating element 36 is thermostatically controlled to assure that the blocking compound is at the optimum temperature. A hole 38 in the bottom of the hopper is closed by a movable valve member 29 which is vertically movable through a lever 40 having a weight 41 disposed at the outermost end thereof to bias the valve member 39 in a downward, or closing position.

To use the device, a block of the desired size and concavity or convexity is placed within the sleeve 15 to rest on the ledge 14 of the body 10. If the block is smaller than the inside diameter of the sleeve 15, an adapter 25 will first be placed on the upper edge of the sleeve 15. The device with the block is then placed beneath the hopper 35, and the weight 41 is lifted to raise the valve member 39 and allow some blocking compound to flow from the hopper into the block. The device is then removed from the blocking compound dispenser, and a semi-finished lens is placed on the upper edge of the sleeve 15. The semi-finished lens is pushed downwardly with uniform pressure on the lens against the tension of the spring 29 so that the finished side of the lens will engage the blocking compound in the block. The lens can be held in this position for a brief period of time, during which the heat in the blocking compound will be dissipated, aided by the cooling fins 16. The semi-finished lens will be adhered to the block 21 so it can be removed from the blocking device and placed in a grinding machine for the other side of the lens to be ground. Care must be taken to align the axis of the lens with the indicium 22 on the block 21; however, this is extremely easy and causes no additional trouble since the lens will already be marked with its various axes.

It will thus be seen that the lens blocking device of the present invention provides a very simple device that is quite easy to use. The device can be used for convex or concave lenses with no appreciable changes; nor are there any delicate parts to get out of adjustment. The device should therefore have a long, trouble free and useful life.

It will be understood by those skilled in the art that the particular device here presented is by way of illustration only, and is meant to be in no way restrictive; therefore, numerous changes and modifications may be made, and the full use of equivalents restored to, without departing from the spirit or scope of the invention as outlined in the appended claims.

What is claimed as my invention is:

1. A lens blocking device including a cylindrical body adapted to receive a lens block thereon, said body having an axial cavity therein to receive a shank of said lens block; a sleeve surrounding said body and slidable axially thereof, the inside dimension of said sleeve being such size to retain said lens block in axial alignment therewith, the upper edge of said sleeve being adapted to receive a semi-finished lens with the axis of the lens aligned with the axis of said lens block, said sleeve being slidable to the extent necessary for a semi-finished lens received on said upper edge of said sleeve to abut said lens block.

2. A lens blocking device including a cylindrical body having an axial cavity in one end thereof to provide a circumferential wall adapted to receive a lens block thereon, an enlarged base portion on the opposite end of said cylindrical body, a sleeve surrounding said cylindrical body and slidable thereon, a spring between said enlarged base portion and one end of said sleeve to urge said sleeve away from said base portion, means for limiting the sliding motion of said sleeve with respect to said cylindrical body, a plurality of heat radiating fins on the end of the said sleeve that is adjacent said one end of said cylindrical body.

3. Lens blocking apparatus including a lens block means for receiving said lens block, means for receiving a semi-finished lens, said means for receiving a lens block being mounted within said means for receiving a semi-finished lens and being axially aligned therewith and axially movable therein, means for mounting a semi-finished lens on said means for receiving a semi-finished lens to enhance the setting of said mounting means.

4. A lens blocking device including a cylindrical body having a cavity in one end thereof to provide a circumferential wall, an enlarged base portion on the opposite end of said cylindrical body, a sleeve surrounding said cylindrical body and slidable thereon, a plurality of heat dissipating fins on one end of said sleeve, said one end of said sleeve being adjacent said one end of said cylindrical body, a spring between said enlarged base portion, and the opposite end of said sleeve to urge said sleeve away from said enlarged base portion, said sleeve having an elongate slot therein with the longer dimension of said slot parallel with the axis of said cylindrical body, a screw projecting through said elongate slot to limit the motion of said sleeve with respect to said body, an adapter ring having an outside dimension substantially equal to the inside dimension of said sleeve, a shoulder on one end of said adapter ring to engage the end of said cylindrical sleeve, the inside of said adapter ring being substantially equal to the outside dimension of a lens block to be received by the device, said circumferential wall of said cylindrical body being adapted to receive the lens block, the end of said adapter ring being adapted to receive a semi-finished lens thereon, said sleeve being movable to a sufficient extent for a semi-finished lens on said adapter ring to abut a lens block received on said circumferential wall of said cylindrical body.

5. Lens blocking apparatus having means for receiving a lens block including a body having an axial cavity in one end thereof to provide a circumferential wall, means for receiving a semi-finished lens including a sleeve axially aligned with said body and slidable axially of said body, means for placing a small quantity of blocking compound in said lens block after said lens block has been received by said means for receiving a lens block, and heat dissipating means carried by said means for receiving a semi-finished lens to enhance the setting of said small quantity of blocking compound.

6. Lens blocking apparatus having: means for receiving a lens block, including a body having an axial cavity in one end thereof to provide a circumferential wall; means for receiving a semi-finished lens, including a sleeve axially aligned with said body and slidable axially of said body; means for placing a small quantity of blocking compound in said lens block after said lens block has been received by said means for receiving a lens block, including a hopper, thermostatically controlled heating means within said hopper, and a valve on said hopper to selectively dispense blocking compound from said hopper; and heat dissipating means carried by said means for receiving a semi-finished lens to dissipate heat from said small quantity of blocking compound.

7. Lens blocking apparatus having: means for receiving a lens block, including a body having an axial cavity in one end thereof to provide a circumferential wall; means for receiving a semi-finished lens, including a sleeve axially aligned with said body and slidable axially of said body; means for placing a small quantity of blocking compound in said lens block after said lens block has been received by said means for receiving a lens block, including a hopper, thermostatically controlled heating means within said hopper, and a valve on said hopper to selectively dispense blocking compound from said hopper, said valve being of such dimensions that the flow through said valve can be received completely by said lens block; and, heat dissipating means including a plurality of heat radiating fins on said means for receiving a semi-finished lens to cool the blocking compound.

8. A lens blocking device comprising:
  (a) a lens block having an axial shank extending therefrom;
  (b) a body adapted to receive said lens block thereon, said body having an axial cavity therein to receive said shank of said lens block;
  (c) a sleeve surrounding said body and being axially aligned therewith, said sleeve being slidable over said body from an up position to a down position;
  (d) means for biasing said sleeve toward its up position;
  (e) an upper edge of said sleeve adapted to receive a semi-finished lens with its axis aligned with the axis of said lens block, said sleeve and upper edge being constructed and arranged so that a semi-finished lens received on said upper edge abuts said lens block when said sleeve is in its down position.

References Cited

UNITED STATES PATENTS

| | | | |
|---|---|---|---|
| 1,261,766 | 4/1918 | Challet | 51—277 |
| 1,332,778 | 3/1920 | Taylor et al. | 51—277 |
| 1,456,673 | 5/1923 | Dey | 51—277 |
| 2,301,035 | 11/1942 | Golderer | 51—277 |
| 2,441,472 | 5/1948 | D'Avaucourt | 51—277 X |
| 3,091,062 | 5/1963 | Suddarth | 51—277 |
| 3,183,637 | 5/1965 | Thomas | 51—277 X |

LESTER M. SWINGLE, *Primary Examiner.*